(12) United States Patent
Goulet et al.

(10) Patent No.: US 6,419,787 B2
(45) Date of Patent: *Jul. 16, 2002

(54) PROCESS FOR RECYCLING PAPER BROKE CONTAINING WET STRENGTH ADDITIVES

(75) Inventors: Mike T. Goulet; Robert J. Makolin, both of Neenah, WI (US)

(73) Assignee: Kimberly-Clark Worldwide, Inc., Neenah, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/465,922

(22) Filed: Dec. 17, 1999

(51) Int. Cl.[7] ............................. D21H 11/14; D21B 1/08
(52) U.S. Cl. ............................. 162/4; 162/55; 162/191
(58) Field of Search ............................. 162/4, 55, 191

(56) References Cited

U.S. PATENT DOCUMENTS

| | | | |
|---|---|---|---|
| 3,773,613 A | | 11/1973 | Lee et al. |
| 4,615,767 A | * | 10/1986 | Miers et al. .................... 162/4 |
| 4,668,339 A | | 5/1987 | Terry |
| 4,722,964 A | * | 2/1988 | Chan et al. .................. 524/608 |
| 4,735,682 A | * | 4/1988 | Didwania et al. ............... 162/8 |
| 4,867,383 A | | 9/1989 | Terry et al. |
| 5,059,280 A | | 10/1991 | Thompson et al. |
| 5,401,810 A | * | 3/1995 | Jansma et al. ............... 525/385 |
| 5,429,310 A | | 7/1995 | Keller et al. |
| 5,527,432 A | | 6/1996 | Leuthold et al. |

OTHER PUBLICATIONS

Article –Wt Strength Resins and Their Application, TAPPI, Committee Assignment No. 810506.03, TAPPI Press, 1994.
Article –The Chemistry of wet–Strength Broke Repulping, Hercules Inc., Progress in Paper Recycling, Aug. 1992.

* cited by examiner

Primary Examiner—Dean T. Nguyen
(74) Attorney, Agent, or Firm—Dority & Manning, P.A.

(57) ABSTRACT

The present invention is generally directed to a process for recycling paper containing wet strength additives. The process generally includes the step of mechanically fiberizing the paper in order to reduce the paper into substantially discreet fibers. The paper can be fiberized in various devices, including mills and pulverizers. Once the paper has been converted into substantially discreet fibers, the fibers can then be used in forming various paper products, including wipers and tissues. Of particular advantage, it has been discovered that fibers produced according to the process of the present invention produce paper webs having high bulk, high brightness, high porosity, and high opacity.

22 Claims, 6 Drawing Sheets

PROCESS FOR RECYCLING PAPER BROKE CONTAINING WET STRENGTH ADDITIVES

FIELD OF THE INVENTION

The present invention is generally directed to a process for recycling paper broke containing a wet strength additive. More particularly, the present invention is directed to a process for recycling paper broke containing a wet strength additive by mechanically fiberizing the broke into substantially discrete fibers. Once recycled into discreet fibers, the broke can then be used in forming any paper product, such as wipers and tissues.

BACKGROUND OF THE INVENTION

During the production of tissue and paper products, significant amounts of scrap material are accumulated. This waste product, also known as broke, is generated from products that do not fall within manufacturer's specifications or from excess paper remaining after the finished product is completed. Since broke is essentially unused raw material, a process to recycle it for future use would eliminate the inefficient disposal of a valuable source of papermaking fibers.

Problems have been experienced in the past, however, in being able to reuse the paper fibers contained in broke. For instance, prior to using broke for making a commercial tissue, wiper or other similar product, it is necessary to treat the fiber source to chemically degrade unwanted chemical constituents which may adversely affect the quality of the recycled paper product. Notable examples of contaminants that must be removed from broke before the broke can be recycled are wet strength additives. Wet strength additives are added to fibers during the wet end process of the papermaking procedure to increase the strength of tissue and paper products when wet. Examples of wet strength additives include but are not limited to polyamines, urea-formaldehyde, melamine-formaldehyde, alkaline-curing polymeric amine-epichlorohydrine, ketene dimers and glyoxalated polyacrylamide resin.

Historically, permanent wet strength broke has been broken down and recycled using chemical processes. Specifically, there have been three types of chemical processes employed for repulping permanent wet strength broke. The purpose of each of the chemical treatments is to aid in degrading the wet strength chemistry so the mechanical action of the pulper rotor can degrade the tissue or paper into individual fibers suitable for reuse in other products. The first and most effective of these chemical processes to remove wet strength additives includes treating the broke with hypochlorite, chlorine, or hypochlorous acid, depending on reaction conditions in the hydrapulper, to chemically oxidize the wet strength resin molecule and thus allow the tissue to be further broken down by the shearing and mechanical action of the pulper rotor. The - disadvantages of this process include potential chloroform generation, loss of brightness on unbleached fiber, and increased potential for corrosion of the paper machine.

Another chemical process entails treatment of the fiber with caustic and high temperature to swell the wet strength tissue structure such that the mechanical action of the hydrapulper can defiberize the sheet. Although this process is effective on unbleached grades of fiber, the disadvantages of this procedure are the need for heating the pulpers and the handling of caustic treatments. Caustic can also darken the fibers.

Finally, the third chemical process for repulping permanent wet strength broke includes treating the broke with persulfate salts. As with the other chemical procedures, the treatment with persulfate salts possesses disadvantages such as the need to neutralize residual persulfate, the need for pH and temperature adjustment, and the high cost of chemicals.

Using chemical processes to prepare wet strength broke for recycling can be expensive because of the additional cost of chemicals described in the aforementioned processes. In addition, there are certain types of fibers which cannot be successfully defibered using chemical treatments in the wet state. Also, there are certain grades of wet strength additives that may not be adequately defibered by chemical treatment. Finally, chemical treatments may have unfavorable reactions with the fiber. An example of such a chemical interaction is the yellowing that occurs when mechanically pulped fibers are contacted with hypochlorite, chlorine, hypochlorous acid, or caustic (sodium hydroxide).

Accordingly, there remains a need for a fiberizing process for broke containing wet strength additives that avoids the use of chemical treatments in the wet state.

SUMMARY OF THE INVENTION

The present invention recognizes and addresses the foregoing drawbacks, and deficiencies of prior art constructions and methods.

Accordingly, it is an object of the present invention to provide an improved method for recycling broke containing wet strength additives.

Another object of the present invention is to provide a process for recycling broke containing wet strength additives without having to chemically treat the broke.

It is another object of the present invention to provide a method for recycling broke containing wet strength additives by mechanically fiberizing the broke.

Still another object of the present invention is to provide a process for mechanically recycling broke containing a wet strength additive for forming paper products, such as wipers and tissues.

These and other objects of the present invention are accomplished by providing a process for recycling paper containing wet strength additives. The paper containing the wet strength additives can be broke obtained from, for instance, wipers, tissues and other similar paper products. According to the present invention, the paper containing the wet strength additive is mechanically fiberized for a time sufficient to overcome fiber bonds formed by the wet strength additives. Ultimately, the paper is fiberized into substantially discrete fibers. The discrete fibers can then be re-incorporated into a fiber furnish for forming a paper web, which can then be used in forming various products.

The process of the present invention can be used to process papers containing any amount of a wet strength additive. For most applications, however, the paper will contain from about 0.5% to about 5% by weight of the wet strength additive and particularly from about 0.5% to about 2% of the wet strength additive. The wet strength additives present in the paper can vary depending upon the particular application. Examples of wet strength additives include polyamines, urea-formaldehydes, melamine-formaldehydes, epichlorohydrines, ketene dimers, and polyacrylamide resins.

Prior to being fiberized, the paper containing the wet strength additive can be dried and shredded if desired. In general, the paper being fiberized should have a moisture content of less than about 20%, and particularly less than about 15%. Preferably, the paper has a moisture content that is about the same as or less than the moisture content of the atmosphere.

Various devices can be used in order to mechanically fiberize the paper. In general, a mill or pulverizer is used in the process. Specific examples of mills that can be used include a hammermill, a disc mill, a pin mill or a wing beater mill.

Once the paper is recycled into discrete fibers, the fibers can be used to form various products. For instance, the fibers can be incorporated into an aqueous fiber furnish and used to form various paper webs. The fiber furnish can contain recycled broke alone or in combination with other various types of fibers. Products that can be made with the recycled broke include wipers, tissues, and various other similar products.

Other objects, features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
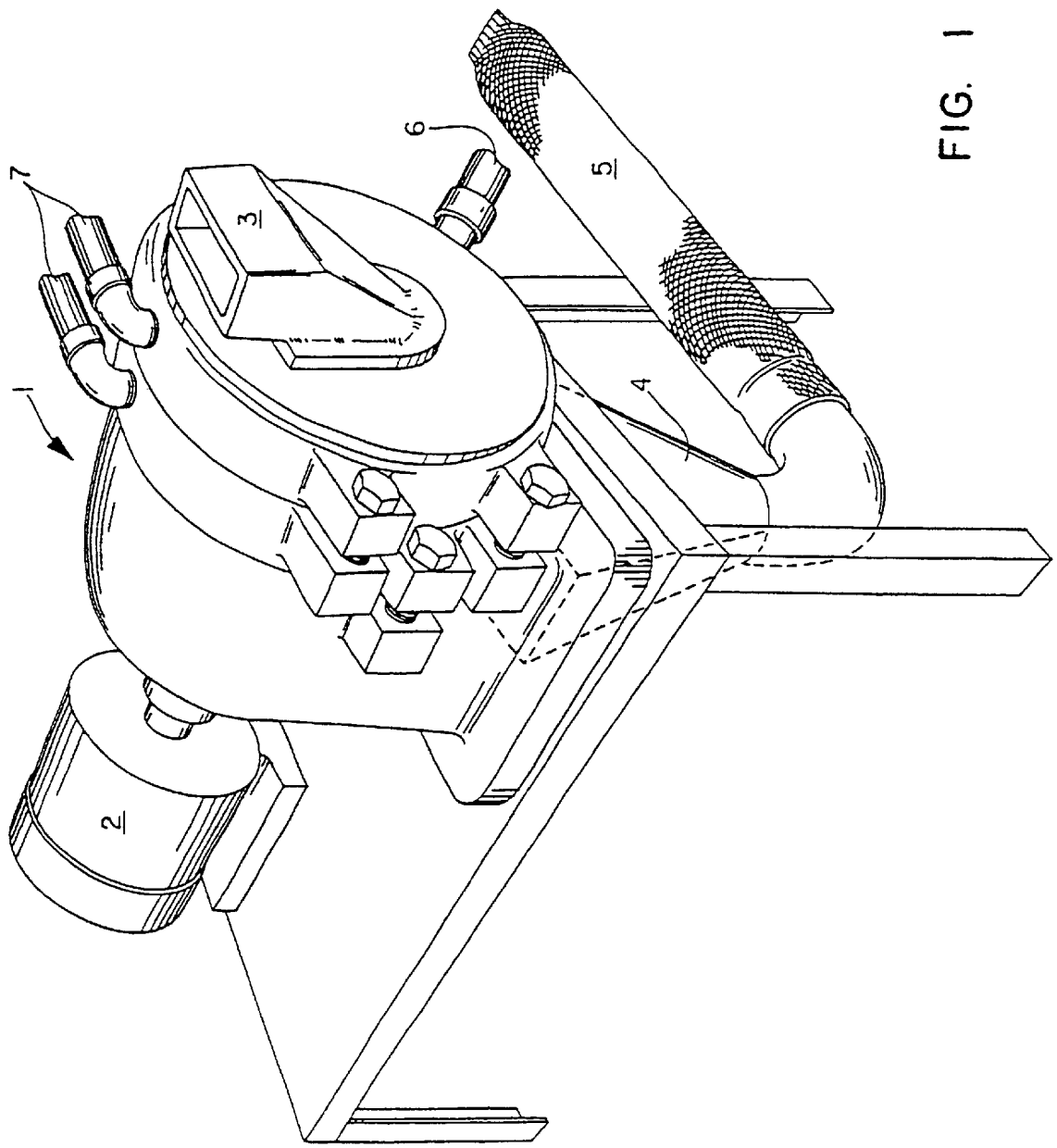
FIG. 1 is a perspective view of an example of a fiberizer apparatus used to carry out the process of the present invention.

Repeat use of reference characters in the present specification and drawings is intended to represent same or analogous features or elements of the present invention.

DETAILED DESCRIPTION OF THE PREFERRED EMBODIMENTS

It is to be understood by one of ordinary skill in the art that the present discussion is a description of exemplary embodiments only, and is not intended to limit the broader aspects of the present invention which broader aspects are embodied in the exemplary construction.

The present invention embodies the use of a dry mechanical treatment for reworking wet strength broke in preparation for reuse in tissue and other paper products, thus avoiding the need for chemical treatment in the wet state. In general, the invention resides in a method for dry fiberizing waste broke comprising wet strength additives by first mechanically fiberizing a wet strength additive-bearing broke source in a substantially dry state, preferably air dry, thereby producing discrete fibers. As used herein, "air dry" refers to the moisture content of the broke being in equilibrium with atmospheric conditions to which it is exposed. Next, the dry fibers are redispersed in water to form a slurry for the preparation of tissue or paper products.

According to the present invention, fiberization is conducted when the wet strength broke is air dry or otherwise substantially dry. In one specific embodiment of the invention, a Pallmann pulverizer is used for defibering the wet strength broke. Other equipment such as a hammermill or similar type of mechanical fiberizing equipment may be used.

An example of a fiberizing apparatus that may be used in the process of the present invention is disclosed in U.S. Pat. No. 4,668,339 to Terry which is incorporated herein by reference in its entirety. Other fiberizing processes are also disclosed in U.S. Pat. No. 4,867,383 and U.S. Pat. No. 4,615,767, which are both incorporated herein by reference. The prior patents are primarily directed to a process for removing ink-bearing fines from various fiber sources. None of these references, however, disclose or suggest dry fiberizing paper containing wet strength additives in order to recycle the fibers contained within the paper. In fact, as discussed above, in the past it has been taught to chemically treat paper containing wet strength additives in order to recycle the paper.

Once the dry fiberization process has been completed, the individual fibers can be re-dispersed in a water slurry of 3–5% consistency in a stock chest. The broke fibers can then be blended with the other furnish components and used to produce tissue, wipes or other similar paper products. Tissue or paper made from the resultant mechanically defibered broke is characterized as having higher bulk, porosity, opacity, and brightness than tissue or paper made from conventionally chemically reworked broke. Including the elimination of additional chemical costs, the dry fiberization process can also be used on any furnish type without discoloring pulps. Also, the present invention is independent of the level of wet strength in the product or type of wet strength resin used with the product.

The fiberization apparatus illustrated in FIG. 1, a turbomill, represents one example of a fiberizer that may be used in the present invention. However, those skilled in the art may use a variety of fiberization apparatus units available to carry out the process of this invention, such as a Pallmann pulverizer, hammermills, disc mills, pin mills, wing beater mills, etc. In general in FIG. 1, the fiberizer 1 comprises a housing which encloses rotating rotor blades (See FIG. 2) driven by a suitable drive means 2. The wet strength broke, which may be shredded, is fed through feed inlet 3 and the waste paper is comminuted or fiberized substantially to individual fibers. An internally disposed fan draws air in through the feed inlet 3 along with the waste paper, and expels the air through exit port 4 carrying the fibers along with the air. The fibers are collected in a tubular meshed bag 5 or other suitable container. Also shown in FIG. 1 is cooling means having water supply inlet 6 and exit ports 7 for removing heat generated due to friction by the shearing of the fiber feedstock.

Figure 2:
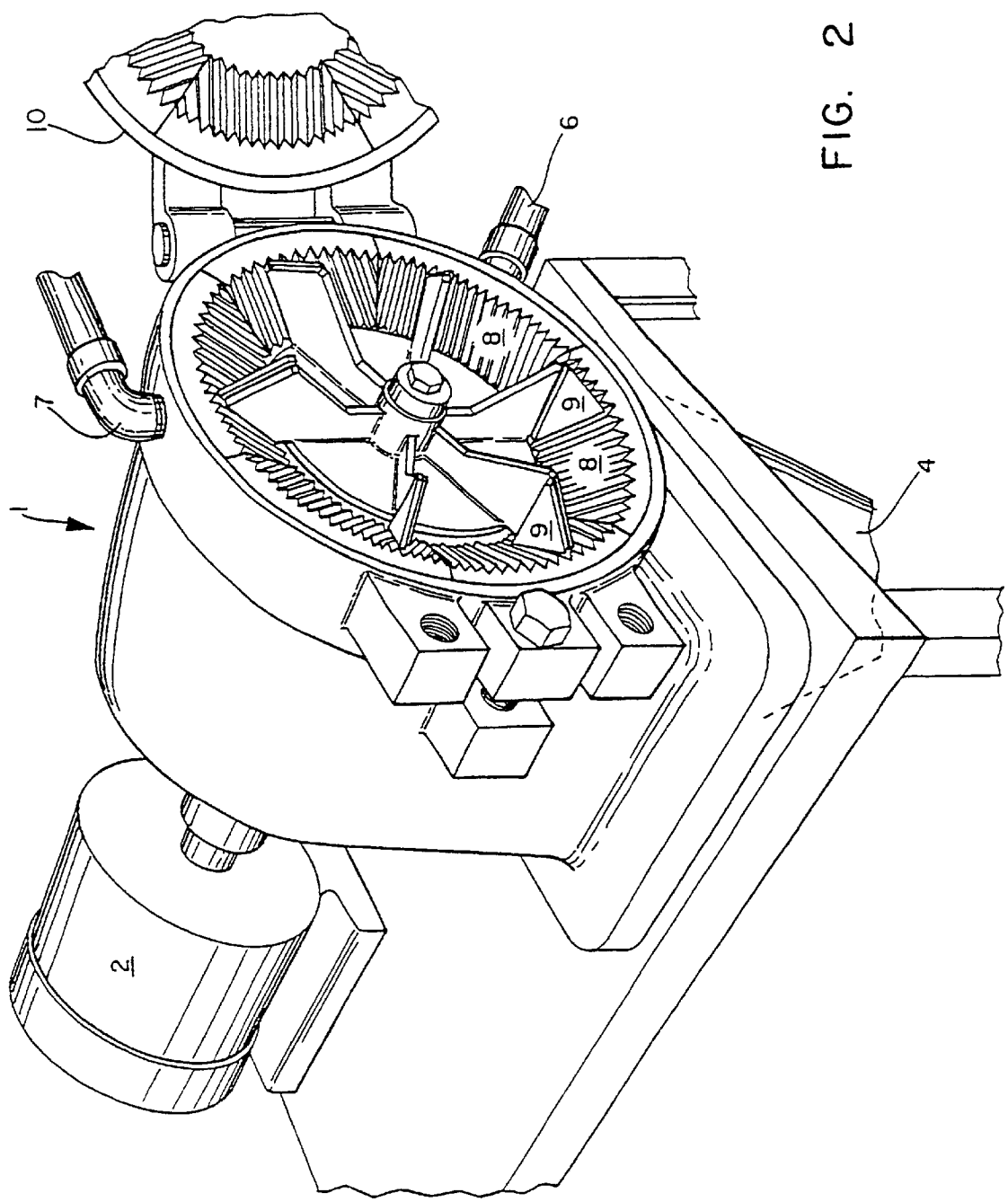
FIG. 2 is a perspective view of the fiberizer of the type shown in FIG. 1 with the front lid opened to expose the impeller blades and serrated working surface.

FIG. 2 illustrates the internal working chamber of the fiberizer, primarily illustrating the position of the rotor blades. There is shown a serrated, grooved working surface 8 against which the feed material is abraded by the action of the moving rotor blades 9. Although not clearly shown in this Figure, there is a space between the serrated working surface and the blades in which cellulosic materials are buffered about. The blade position relative to the working surface 8 is adjustable to add a degree of control over the extent of fiberization, which is also controlled by the rotor speed, the residence time, the gap between the rotor and the stator, and the nature of the working surface.

The working surface 8 consists of six removable segments. These can be replaced by a greater or fewer number of segments having a different design or configuration with respect to the surface. This flexibility provides an infinite number of choices for altering and optimizing the fiberization. More specifically, the grooves of each segment as shown are parallel to each other and are spaced apart by about 2 millimeters (mm), measured peak-to-peak. Each groove is about 1.5 mm deep. The radial width of each segment is about 10 centimeters (cm). These dimensions are given only for purposes of illustration and are not limiting, however. Also, partially shown is the working surface on the inside of the hinged cover 10, which is substantially identical to the other working surface 8 already described. When the cover is closed, the two working surfaces provide an inner chamber in which the feed material is fiberized.

Figure 3:
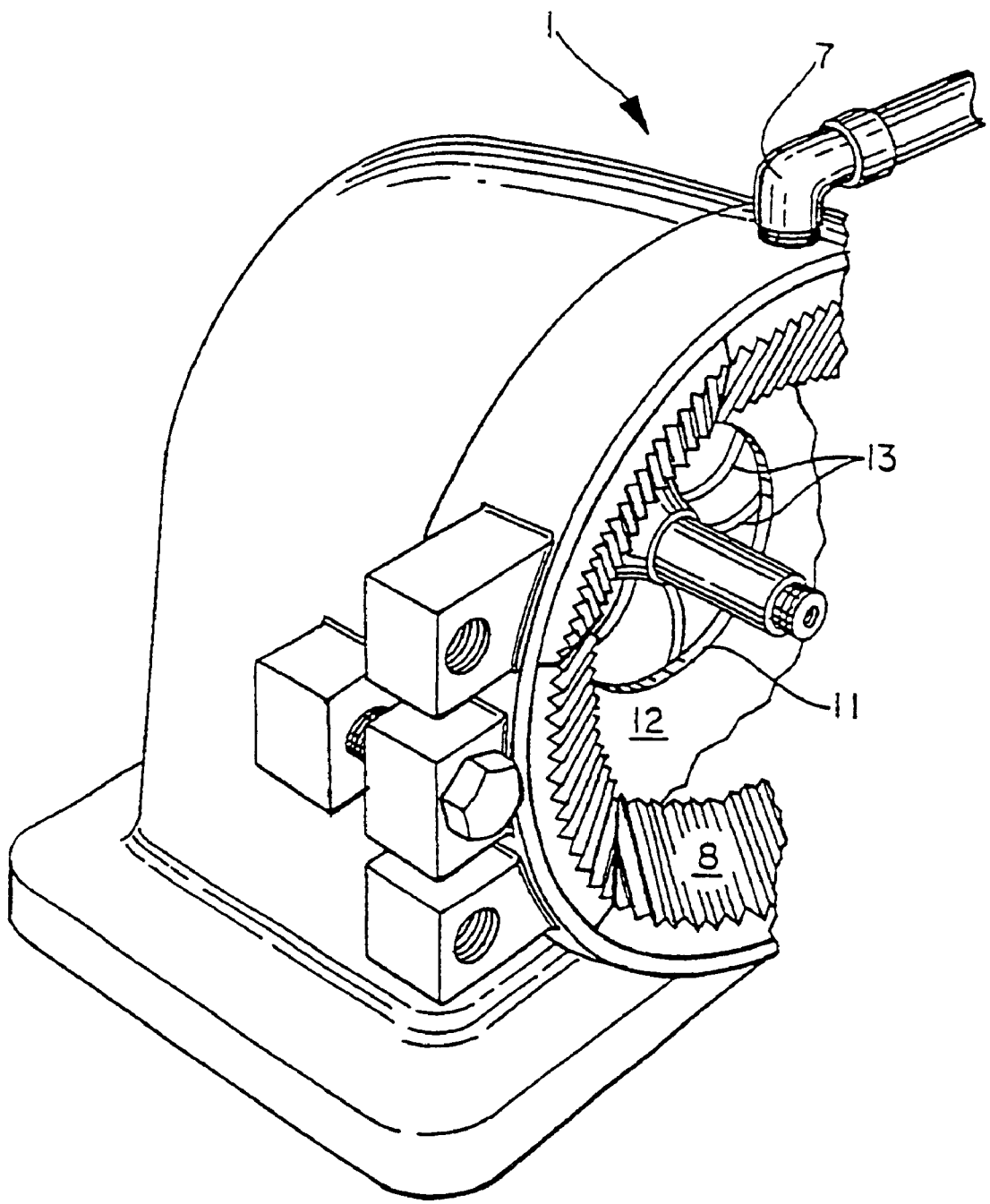
FIG. 3 is a cut-a-way perspective view of the opened fiberizer with the impeller removed to expose the orifice through which the processed fibers are withdrawn from the working chamber.

FIG. 3 is a cut-a-way perspective of the fiberizer with the rotor removed to expose the orifice 11 through which the fiberized material passes before exiting through the exit port 4. The size of the orifice is variable which controls the degree of fiberization by increasing or decreasing the air flow rate and hence the residence time within the fiberizer. The orifice is contained within a removable plate 12 for convenient changing of the orifice size. An orifice diameter of 160 mm has been found to be suitable in conjunction with an air flow rate of about 10 cubic meters per minute. Also shown in FIG. 3 are the impeller blades 13 of the fan which provides the flow of air through the fiberizer.

Figure 4:
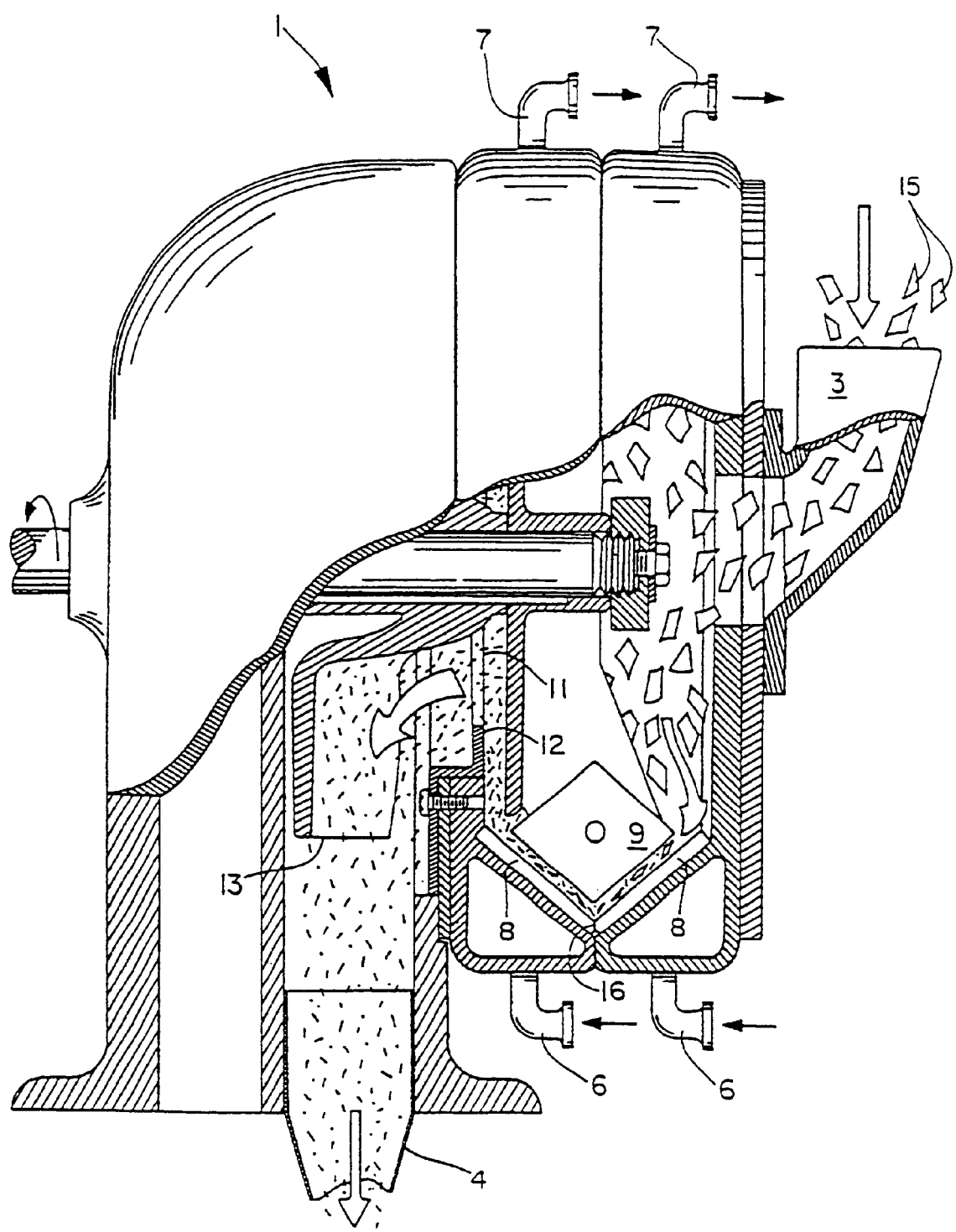
FIG. 4 is a side elevation of the fiberizer partially in section illustrating its operation.

FIG. 4 is a cross-sectional, cut-a-way view of the fiberizer schematically illustrating its operation. The arrows indicate the direction of flow of air and fibers. More specifically, the wet strength broke source 15 is introduced into the feed inlet 3 where it is contacted by the rotating blades 9. The air flow directs the wet strength broke between the rotor blades and the working surface 8 such that the wet strength broke is comminuted into smaller and smaller particles, eventually being reduced or fiberized to substantially discrete fibers. The centrifugal forces created by the rotor blades tend to force the particles, preferentially the larger particles, to the apex 16 between the angled working surfaces. These forces tend to keep the larger particles from escaping before they have been completely fiberized. Upon substantially complete fiberization, the comminuted solid materials are carried through the orifice 11 of the removable plate 12. The fan impellers 13 then force the airborne fibers out through the exit port 4.

Figure 5:
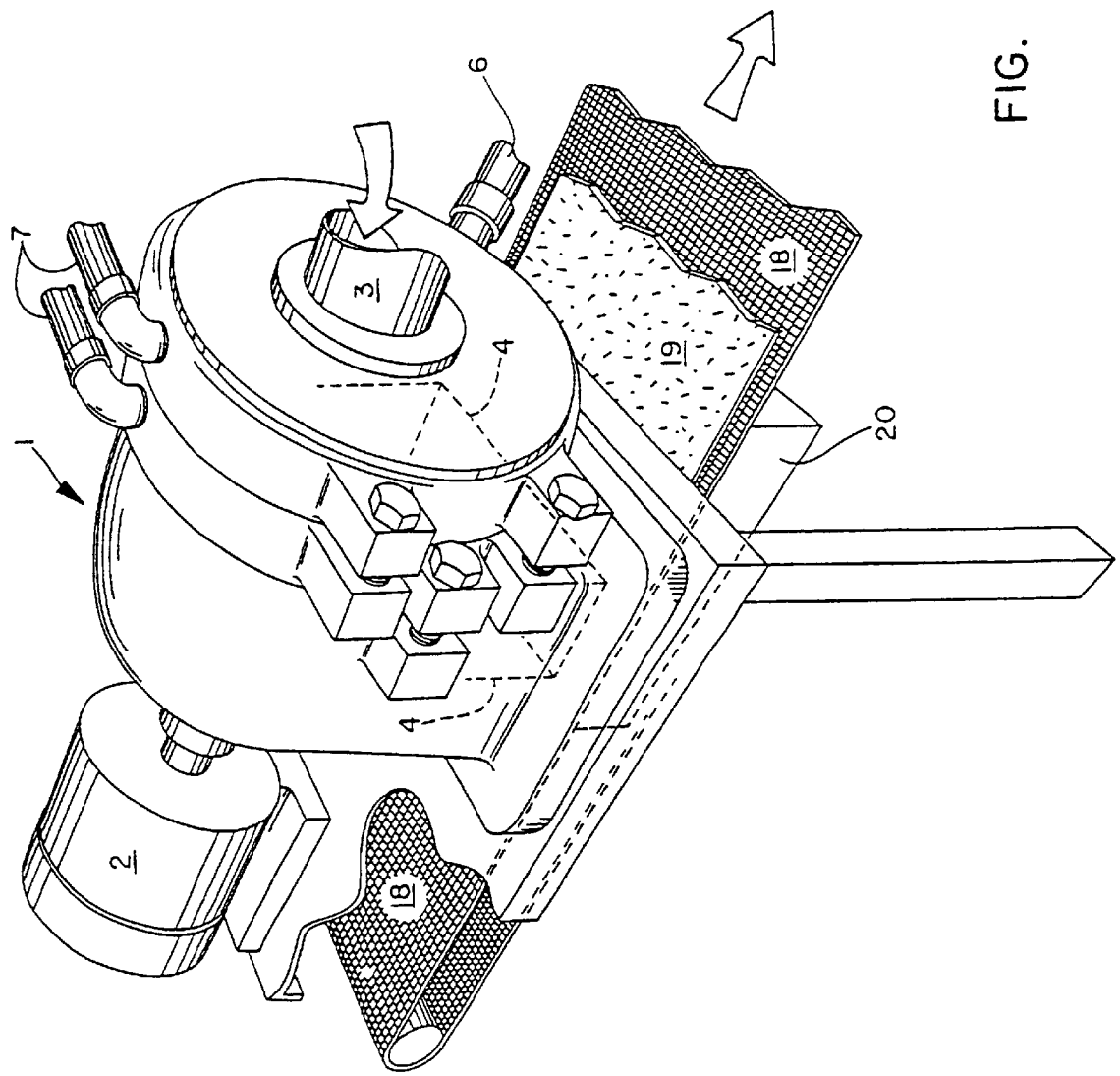
FIG. 5 is a perspective view of a fiberizer modified to operate in a continuous mode.

FIG. 5 illustrates the operation of the fiberizer previously described, but slightly modified for continuous operation as would likely be required for commercial operation. In this embodiment, the feed inlet 3 is shown as a tubular inlet rather than the hopper as shown in FIG. 1. The feed tube will provide a continuous supply of shredded wet strength broke material of suitable size and quality. Generally speaking, such a material can be in the form of sheets from about 2 to about 4 inches square or less and should be free of debris to protect the fiberization apparatus. However, the particle size and shape of the feed will depend on the capabilities of the particular fiberizer being used and is not a limitation of this invention.

A further modification illustrated is the continuously moving screen 18 which collects the fibers in the form of a web or batt 19. Shown in phantom lines is a modified exit port 4 which has been widened to accommodate the width of the moving screen.

In one embodiment, the fiberizer is configured to receive broke at a rate of at least 1.5 pounds per minute. In this embodiment, the fiberizer can be set up with a 3 mm clearance between the serrated working surface and the rotor blades. A removable plate having an orifice of 140 mm can be installed behind the impeller, which travels at, for instance, 4830 revolutions per minute (r.p.m.) with no load. Air flow through the fiberizer can be about 365 cubic feet per minute. Cooling water can be fed to the cooling jacket at the rate of 2 liters per minute. Typically, the initial water temperature will be 59–60 degrees Fahrenheit (F.) and will level off at 66–68 F. after an extended run. The speed of the wire receiving the fiberized material from the fiberizer can be set at 350 feet per minute.

Figure 6:
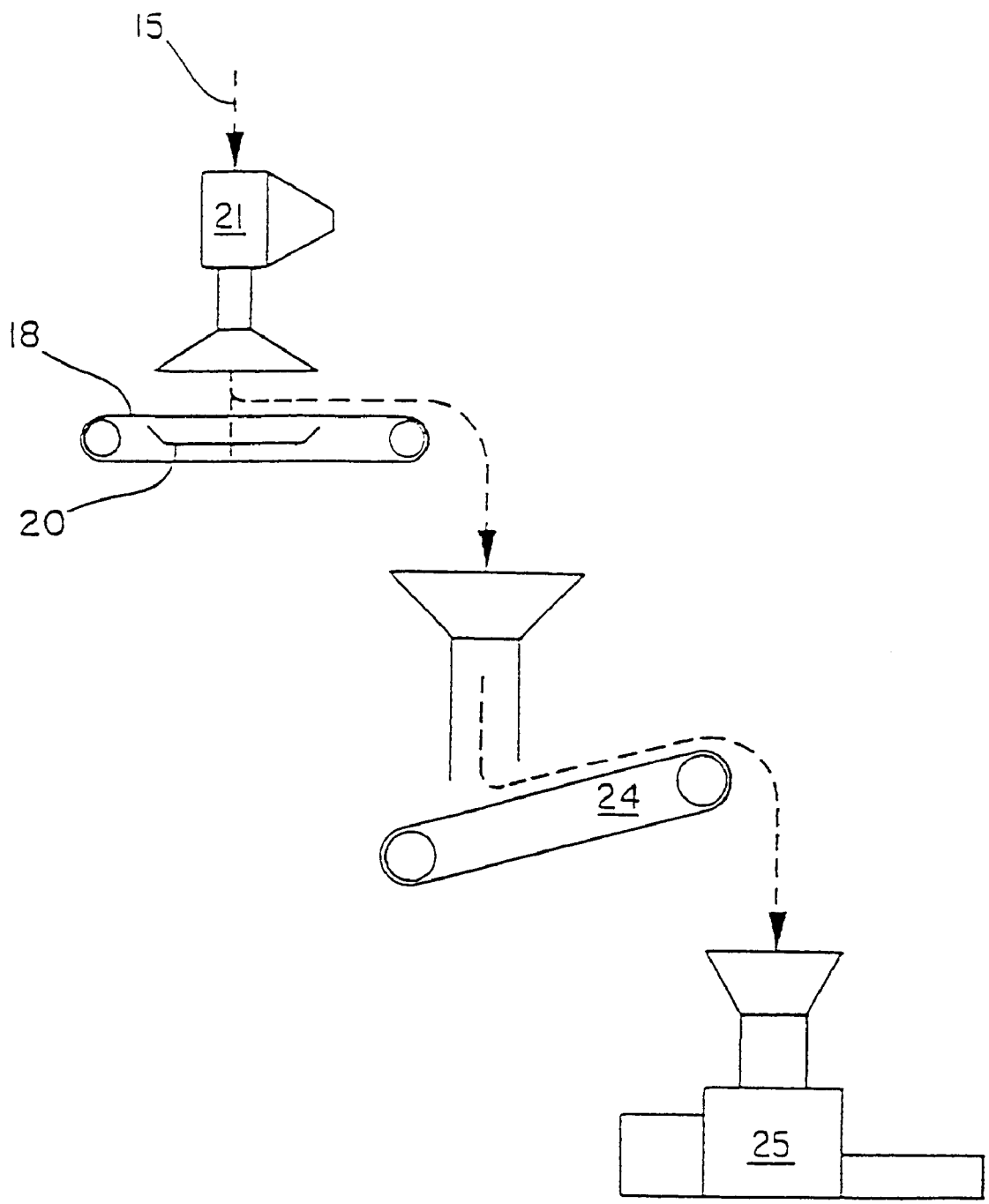
FIG. 6 is a schematic flow diagram illustrating a process in accordance with this invention.

FIG. 6 schematically illustrates an overall view of a process in accordance with this invention. More particularly, it shows a source of wet strength broke 15 being fed to a fiberizer 21 identical to or similar in function to the type described in the previous Figures. In the fiberizer the wet strength broke, whether shredded or not, is substantially reduced to individual or discrete fibers and deposited on a moving screen 18. Deposition of the fibers onto the screen is aided by a vacuum box 20. The fibrous mass or batt of fibers deposited on the moving screen is thereafter recovered by metering to a uniform thickness in a suitable metering device 24 and thereafter converted into bales of pulp in a baler 25 or, alternatively, fed directly into a pulper to form a pulp slurry for making paper in the conventional manner. In addition, the recovered fibers can be fed directly to an air-forming apparatus for producing air laid webs or batts. Those skilled in the art will recognize that a variety of apparatus or equipment can be used in performing the functions illustrated herein.

EXAMPLES

In order to illustrate the effectiveness of the process of the present invention, dry fiberizing of a wet strength broke source in accordance with the present invention was carried out using a pulverizer as the fiberizer apparatus. Additional wet strength broke of the same source was also wet fiberized using hypo bleach to compare the two processes against one another. The wet strength broke source originated from SCOTT towels. The results are set forth in Table I below.

The properties of the SCOTTO® towel broke that was used in the example are as follows:

| Basis Weight of Towel: | 23.5 lbs/2880 sq. ft. |
|---|---|
| Furnish: | 20% hardwood Kraft |
| | 60% softwood Kraft |
| | 20% Broke |
| Kymene additive level: (wet strength additive) | 1.0% (20 lbs/ton) |

After the broke was reduced to individual fibers using the hypo bleach process and the dry fiberizing process of the present invention, paper hand sheets were formed from the fibers and tested. In particular, the hand sheets were tested for their drainage properties (Canadian Standard Freeness TAPPI test), for tensile strength, for stretch characteristics, for slope, for caliper, for tear resistance, for porosity, for brightness using an Elrepho Photoelectric Reflectance Photometer, for opacity, and for weighted average fiber length (WAFL) which was determined using a Kajaani FS-200 device. The above tests performed were standard tests essentially conforming to TAPPI standard procedure numbers X, Y, Z, A, B, C, D and E, respectively as would be known to one skilled in the art and were used for comparative purposes. The following results were obtained:

TABLE 1

| Sample | | Wet Fiberized "Control" | Dry Fiberized |
|---|---|---|---|
| Freeness | (ml) | 670 | 790 |
| Tensile | (NM/g) | 23.06 | 3.31 |
| Stretch | (%) | 2.16 | 0.86 |
| Tensile Energy Absorbed (TEA) | (gcm/cm$^2$) | 22.64 | 0.87 |
| Slope A | (kg) | 480.0 | 0.0 |
| Caliper | (in) | 0.0066 | 0.0090 |
| Tear | (gf) | 89.83 | 14.23 |
| Porosity | (ft$^3$/min/ft$^2$) | 194.0 | 934.4 |
| Brightness | (ISO, %) | 69.82 | 76.41 |
| L* | | 92.51 | 93.60 |
| a* | | −1.75 | −1.22 |
| b* | | 10.21 | 6.51 |
| Opacity | (%) | 76.01 | 78.23 |
| WAFL | (mm) | 1.86 | 1.69 |

As shown above, in comparison to chemically defibering the broke, the dry fiberization process of the present invention substantially increases freeness and bulk. Further, fibers produced in accordance to the process of the present invention also yielded hand sheets with better brightness and opacity characteristics. The dry fiberization process of the present invention has the potential to produce high bulk, high brightness debonded fibers, in comparison to traditional methods. Further, these improvements are realized at a lower cost and without having to handle the chemicals used in the past.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for recycling paper containing wet strength additives comprising the steps of:

providing paper broke containing at least one wet strength additive, said paper broke having a moisture content of less than 20% by weight, said paper broke originating from a material selected from the group consisting of a paper wiper, a towel, a napkin, a tissue, and mixtures thereof; and mechanically fiberizing said paper broke for a time sufficient to overcome paper bonds formed by said wet strength additive and to reduce said paper broke into substantially discrete fibers.

2. A process as defined in claim 1, wherein said paper broke has a moisture content of less than about 5% by weight.

3. A process as defined in claim 1, wherein said wet strength additive is present within said paper broke in an amount from about 0.1% to about 2% by weight.

4. A process as defined in claim 1, wherein said wet strength additive comprises a material selected from the group consisting of a polyamine, a urea-formaldehyde, a melamine-formaldehyde, an epichlorohydrine, a ketene dimer, and a polyacrylamide.

5. A process as defined in claim 1, further comprising the step of incorporating said substantially discrete fibers into a fiber furnish for forming a paper web.

6. A process as defined in claim 1, further comprising the step of drying said paper broke prior to mechanically fiberizing said broke.

7. A process as defined in claim 1, further comprising the step of shredding said paper broke prior to mechanically fiberizing said broke.

8. A process as defined in claim 1, wherein said paper broke is mechanically fiberized in a mill or pulverizer.

9. A process for recycling paper containing wet strength additives comprising the steps of:

providing a paper product containing at least one wet strength additive, wherein said paper product has a moisture content of less than about 20%;

mechanically fiberizing said paper product for a time sufficient to overcome paper bonds formed by said wet strength additive and to reduce said paper product into substantially discrete fibers;

incorporating said substantially discreet fibers into a fiber furnish for forming a paper web.

10. A process as defined in claim 9, wherein said paper product has a moisture content no greater than the moisture content of the surrounding atmosphere.

11. A process as defined in claim 9, wherein said paper product is fiberized in a mill or pulverizer.

12. A process as defined in claim 9, wherein said wet strength additive comprises a material selected from the group consisting of a polyamine, a urea-formaldehyde, a melamine-formaldehyde, an epichlorohydrine, a ketene dimer, and a polyacrylamide.

13. A process as defined in claim 9, wherein said wet strength additive comprises a ketene dimer.

14. A process as defined in claim 9, wherein said paper product comprises broke obtained from a wiper, a towel, a napkin, a tissue or mixtures thereof.

15. A process as defined in claim 9, wherein said wet strength additive is present within said paper product in amount from about 0.1% to about 2% by weight.

16. A process as defined in claim 9, wherein said paper web formed containing said substantially discrete fibers comprises a wiper or a tissue.

17. A process for recycling paper containing wet strength additives comprising the steps of:

provided a paper broke containing at least one wet strength additive, said paper broke having a moisture content of less than about 20%, said paper broke being obtained from a wiper or a tissue, said wet strength additive comprising a material selected from the group consisting of a polyamine, a urea-formaldehyde, a melamine-formaldehyde, an epichlorohydrine, a ketene dimer, and a polyacrylamide;

mechanically fiberizing said paper broke for a time sufficient to overcome paper bonds formed by said wet strength additive and to reduce said paper product into substantially discrete fibers, said paper broke being fiberized in a mill or pulverizer;

incorporating such substantially discrete fibers into a fiber furnish for forming a paper web.

18. A process as defined in claim 17, wherein said wet strength additive is present within said paper broke in an amount from about 0.1% to about 5% by weight.

19. A process as defined in claim 17, further comprising the step of drying said paper broke prior to mechanically fiberizing said broke.

20. A process as defined in claim 19, further comprising the step of shredding said paper broke prior to fiberizing said broke.

21. A process as defined in claim 17, further comprising the step of shredding said paper broke prior to fiberizing said broke.

22. A process as defined in claim 17, wherein said wet strength additive comprises a ketene dimer.

* * * * *